March 1, 1932.  G. E. KNEPPER  1,847,516
PAWL SAFETY LATCH
Filed March 26, 1928
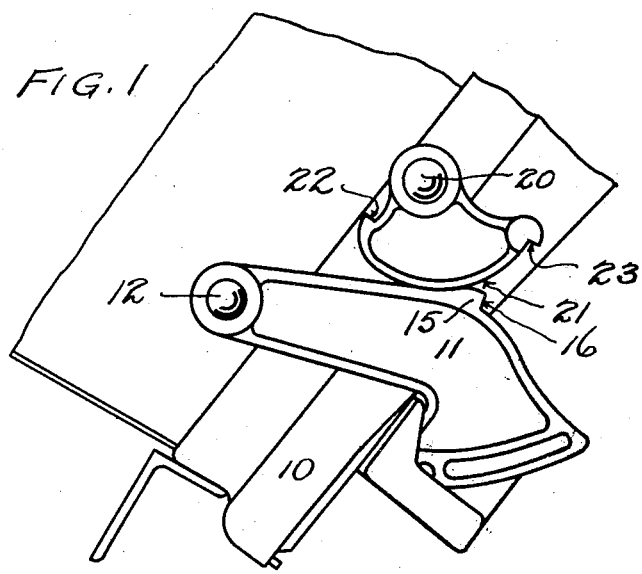
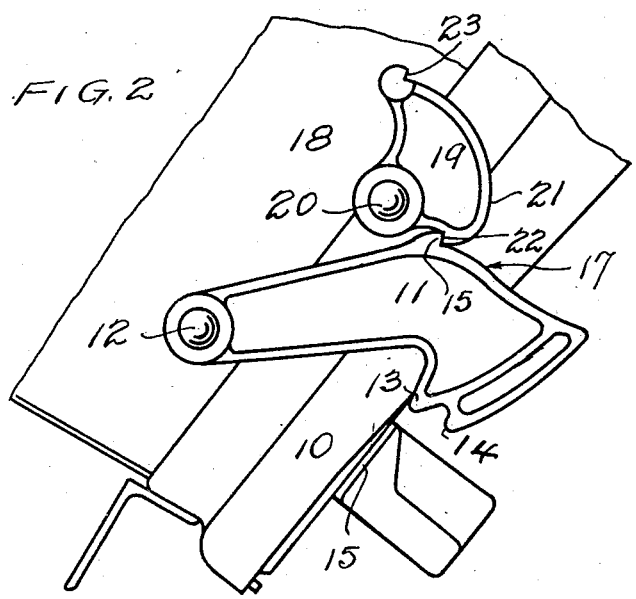
Inventor
GEORGE E. KNEPPER
By N. E. Gee
Attorney Patented Mar. 1, 1932

1,847,516

UNITED STATES PATENT OFFICE

GEORGE E. KNEPPER, OF ALTOONA, PENNSYLVANIA

PAWL SAFETY LATCH

Application filed March 26, 1928. Serial No. 264,610.

This invention relates to railway car doors and has special reference to hopper car drop doors which are placed beneath the car and are held in a closed position by means of a latch, lever or cam device designed to be operated when the door is opened for the purpose of discharging the cargo, and the primary object of this invention is to provide means for holding the door locking pawl in a disengaged position while the car to which the device is attached is being unloaded.

A further object of this device is to provide means for securely holding the door locking pawl in the engaged position while the car with its cargo is in transit.

A still further object of this invention is to provide a safety latch for door locking pawls that can readily be applied to doors, gates and similar structures wherein a pawl is used and means for locking the pawl is desired.

Another object of this invention is to provide a pawl locking device that readily interlocks with the pawl through the gravity action of the pawl and the pawl locking element.

With these and many other objects in view which will become more readily apparent as the nature of the invention is better understood, the same consists in the novel construction, combination and arrangement of parts as will be hereinafter fully described, illustrated and claimed.

It will be readily understood by those skilled in the art to which this invention belongs that the same is susceptible to some structural change and arrangement without departing from the spirit or scope of the invention, but a preferred and practical embodiment of the invention is shown in the accompanying drawings in which—

Fig. 1 shows a portion of hopper car door having my present invention applied thereto. The car door is shown in its closed position, with the latch or pawl in place and the safety pawl in the engaged position which prevents dis-engagement of the door pawl.

Fig. 2 shows the hopper car door in its closed position with the locking pawl out of engagement with the door, and the safety pawl in the position it occupies when the car door is open. Similar reference numerals refer to similar parts throughout the several figures of the drawings.

In the application of this invention to a hopper car door, which is designated in its entirety by the numeral 10, I provide a pawl 11, and a fulcrum point 12 for the pawl. The fulcrum 12 is positioned on the side sheet of the hopper and is therefore fixed with reference to the car door 10. The pawl 11 is provided with a plurality of door engaging lips designated by the numerals 13 and 14 respectively, and each lip is designed to engage the door angle 15, either when the door is closed or when it is partly closed.

The pawl 11 is further provided with an upstanding projection 15, having a right angled face 16 extending across the face 17 of the pawl. Positioned above the pawl 11 and fulcrumed on the side 18 of the car body a safety locking pawl designated by the numeral 19 is shown. The safety locking pawl 19 is provided with a fulcrum pin 20 on which the pawl is adapted to rotate. The pawl is further provided with a cam face 21 which terminates with a right angled shoulder 22 designed to engage and co-act with a similar right angled shoulder on the pawl 11, as shown in both figures of the drawings.

The pawl 19 is further provided with a right angled projection 23 which terminated one end of the cam face 21, and serves as a ready means of lifting the pawl 19 out of engagement with the pawl 11.

Fig. 1 shows the pawl 11 in operative relation with the car door 10 and illustrates the manner of locking this pawl in position with the cam face 21 of the pawl 19. It will be further observed that the centre of gravity of the safety locking pawl 19 is positioned such that any jar or rocking motion of the car only serves to wedge the pawl 11 tighter on the door 10, while Fig. 2 shows how the gravity action aids in keeping the locking pawl in engagement with the door engaging pawl 11.

Hopper car doors fitted with a pawl 11 without the lug 15, have no means for holding the same out of engagement with the door 10, and this is specially noticed when hopper car doors are opened, as each door is provided with two of these pawls and it is necessary to drive a wedge under the pawl to keep it up out of engagement with the door while the operator moved to the opposite side of the car and raises the pawl, thus releasing the door which is thus free to open. With the present invention nothing foreign to the car is needed to keep the door holding pawl out of engagement with the door when the same is disengaged from the door, as the two pawls are interlocked as shown in Fig. 2 of the drawings, which shows that neither pawl can fall without the previous disengagement, which must be manually done.

Having thus described my invention which I claim and desire to be secured by Letters Patent is—

1. In combination with a door or gate locking mechanism, a pawl element fulcrumed such as to swing into locking engagement with the door or gate, an upstanding transverse ledge having a right angled face and a safety pawl fulcrumed above the door locking pawl, gravity actuated, including means for interlocking with and holding the door locking pawl out of engagement with the door, means for securing hinged doors or gates in a closed position through the use of a plurality of pawls, one of which engages the door or gate while the other engages the pawl that secures the door or gate, together with means for interlocking the two pawls when the door securing pawl is out of engagement with the door or gate.

2. In a railway car having a lading discharge opening, the combination with a hinged door for closing said opening, said door being movable to open position under the influence of gravity, a mechanism for supporting the door in a plurality of positions of closure, said mechanism involving a pivotally mounted member and a fixedly mounted member, one of said members being carried by the car body and the other by the door, and rotatable means for locking said pivoted member in door supporting position, the pivoted member having an upwardly projecting lug engageable with a portion of said rotatable means when the latter assumes an inoperative position to maintain the pivoted member in an elevated inoperative position.

3. In a railway car having a lading discharge opening, the combination with a hinged door for closing said opening, said door being movable to open position under the influence of gravity, of mechanism for supporting the door in closed position, said mechanism involving a hook pivotally mounted on the car body and an arm rigidly secured to the door, and rotatable means for maintaining said hook in door supporting position, said rotatable means when in inoperative position being engageable with a portion of said hook to maintain the latter in an inoperative position.

In testimony whereof I affix my signature.

GEORGE E. KNEPPER.